(12) United States Patent
Majaniemi

(10) Patent No.: US 6,393,403 B1
(45) Date of Patent: May 21, 2002

(54) MOBILE COMMUNICATION DEVICES HAVING SPEECH RECOGNITION FUNCTIONALITY

(75) Inventor: Markku Majaniemi, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/102,155

(22) Filed: Jun. 22, 1998

(30) Foreign Application Priority Data

Jun. 24, 1997 (FI) ................................. 972723

(51) Int. Cl.[7] .............................................. G10L 21/00
(52) U.S. Cl. ..................... 704/275; 704/270; 379/88.01
(58) Field of Search ............................... 704/201, 270, 704/275; 455/403, 412

(56) References Cited

U.S. PATENT DOCUMENTS

| | | | |
|---|---|---|---|
| 5,054,082 A | 10/1991 | Smith et al. | 704/275 |
| 5,165,095 A | 11/1992 | Borcherding | 379/88 |
| 5,640,485 A | 6/1997 | Ranta | 395/2.6 |
| 5,659,597 A * | 8/1997 | Bareis et al. | 455/563 |
| 5,729,694 A * | 3/1998 | Holzrichter | 704/270 |
| 5,912,980 A * | 6/1999 | Hunke | 382/103 |
| 5,956,683 A * | 9/1999 | Jacobs et al. | 704/275 |
| 5,960,392 A * | 9/1999 | Sundberg et al. | 704/236 |
| 5,960,393 A * | 9/1999 | Cohrs et al. | 704/240 |

FOREIGN PATENT DOCUMENTS

EP  0 739 121 A2  10/1996

OTHER PUBLICATIONS

"Fundamentals of Speech Recognition", Rabiner et al., pp. 321–348.

* cited by examiner

*Primary Examiner*—Fan Tsang
*Assistant Examiner*—Michael N. Opsasnick
(74) *Attorney, Agent, or Firm*—Perman & Green, LLP

(57) ABSTRACT

A mobile telephone 7 having speech recognition and speech synthesis functionality. The telephone 7 has a memory 16 for storing a set of speech recognition templates corresponding to a set of respective spoken commands and a transducer for converting a spoken command into an electrical signal. Signal processing means 13 is provided for analysing a converted spoken command together with templates stored in the memory 16 to identify whether or not the converted spoken command corresponds to one of the set of spoken commands. The phone user can select to download, into the phone's memory 16, a set of templates for a chosen language, from a central station 18 via a wireless transmission channel.

17 Claims, 3 Drawing Sheets

MOBILE COMMUNICATION DEVICES HAVING SPEECH RECOGNITION FUNCTIONALITY

FIELD OF THE INVENTION

The present invention relates to mobile communication devices and in particular to mobile communication devices arranged to recognise and act upon commands spoken by a user. The invention is applicable in particular, though not necessarily, to mobile telephones.

BACKGROUND OF THE INVENTION

It has long been desired to incorporate speech recognition functionality into mobile communication devices such as mobile telephones. By enabling a user to operate a telephone with spoken commands, e.g. to dial a particular telephone number, operations can be performed more quickly and more easily than is possible with conventional keypad arrangements. Furthermore, it becomes possible to dispense with all or a large portion of the keypad resulting in a considerable space say and allowing further miniaturisation of devices to take place. A similar desire exists to corporate speech synthesis functionality into mobile communication devices allowing requests and responses to be 'spoken' by the device to the user, thus simplifying the operation of the device.

The generic name for a system which comprises both speech recognition and speech synthesis functionality is 'a speech dialogue system' (SDS). In a SDS, speech recognition is usually accomplished using a set of 'templates', each template corresponding to one spoken command. A template is generated by analysing the corresponding command spoken by anything from one to several hundred different speakers. Typically, this analysis comprises extracting parameters, such a frequency spectrum coefficients, from each spoken version of the command and which are characteristic of the spoken command. Where a number of different speakers are used, the parameters are combined in an appropriate way to form a single set of parameters or template.

The generated templates are stored in a look-up table. When a command is spoken and converted into electronic form, the command is analysed to extract therefrom those same parameters which were used to form the templates. The look-up table is then searched to identify whether or not the table contains a template which contains the same, or similar parameters to those of the spoken command. The search may be conducted for example using a least squares measure whilst the degree of similarity required to flag a matching entry is predefined. If a matching entry is identified, then the action corresponding to the command is carried out by the device controller. If no matching entry is found, the user is notified to this effect and is asked to repeat the command.

Templates generated using only a single speaker are known as 'speaker dependent templates' as they can generally only be used to reliably recognise commands spoken by the person from whom they were generated. In the case of a SDS incorporated into a mobile telephone, this person is the telephone subscriber, whilst software (and hardware if necessary) for generating the templates is incorporated into the telephone.

'Speaker independent templates' is the term use to describe templates generated using commands spoken by a large number of different speakers. As speaker independent templates represent a kind of average of an entire class of speaker, they can be used with considerable reliability to recognise spoken commands independently of the speaker. In the case of a mobile telephone, speaker independent templates can be stored in a memory of the device prior to supplying the device to the end-user.

There are advantages and disadvantages to using either speaker dependent or speaker independent templates in mobile telephones. When speaker independent templates are used, the end-user does not need to perform a training or template generation operation, a time consuming and often tedious operation which must be performed when speaker dependent templates are used. However, in the case of speaker independent templates, it is still necessary to generate templates for storage in a memory of the phone prior to supplying the phone. The recording and analysing of commands spoken by several thousand speakers is an extremely demanding and time consuming exercise and can significantly delay the 'time to market' of a new product. This is especially so for a phone offered to a number of different language groups here a set of templates must be generated for each language which the phone supports. Furthermore, the provision in a telephone of even a few such sets of templates can present a considerable memory problem (tens or hundreds of Kbytes per language), increasing the size and/or cost of the telephone. This problem is compounded when speech synthesis functionality is included, it being necessary to store in the phone's memory a set of 'responses' for each supported language.

SUMMARY OF THE INVENTION

It is an object of the present invention to overcome or at least mitigate the above mentioned disadvantages of known speech dialogue systems for use in mobile communication devices.

According to a first aspect of the present invention there is provided a mobile communication device having speech recognition functionality and comprising:

a memory for storing a set of speech recognition templates corresponding to a set of respective spoken commands each template corresponding to a single human language;

transducer means for converting a spoke command into an electrical signal;

signal processing means arranged to analyse a converted spoken command together with templates stored in said memory to identify whether or not the converted spoken command corresponds with one of said set of spoken commands; and means for receiving via a wireless transmission channel said set of templates and for storing this in said memory.

Preferably, said set of templates is a set of speaker independent templates. More preferably the set corresponds to a single human language. The memory may be arranged to store a plurality of sets of templates corresponding to respective human languages and received via said wireless transmission channel. The device may comprise selection means for enabling the user to select a language set for reception via said wireless transmission channel and/or to select a language set for use by said signal processing means.

The present invention makes it possible to provide a mobile communication device having speech recognition functionality, for example a mobile telephone, to an end-user with no (or only a limited number of) speaker independent language template sets. The end-user may then 'download' one or more selected sets of speaker independent templates from a central station. This overcomes the memory storage problem encountered when it is necessary to supply the telephone to the end-user with a set of templates for each supported language, prestored in a memory of the phone. The present invention allows a large number of languages to be supported in a speaker independent manner as there is practically no limit to the number of sets of templates which can be stored at the central station. Furthermore, as sets of templates become available for additional languages, these can be made available to the end-user via the telephone network.

A device according to the above first aspect of the invention may comprises means for generating a set of speaker dependent template using commands spoken by a user and converted by said transducer means, and mean for storing templates so generated in said memory of the device. The device may further comprise means for selecting either the set of speaker dependent templates or a set of speaker independent templates, where such a set is stored in the memory, for use by said signal processing means.

Devices embodying the present invention may comprise means for receiving via said wireless transmission channel a set of speech responses and means for storing such a received set in said memory. The set of received responses may correspond to a single human language.

According to a second aspect of the present invention there is provided a mobile telephone network comprising a multiplicity of mobile communication devices, which devices have speech recognition functionality an they comprise:

- a memory for storing a set of speech recognition templates corresponding to a set of respective spoken commands each template corresponding to a single human language;
- transducer means for converting a spoke command into an electrical signal;
- signal processing means arranged to analyse a converted spoken command together with templates stored in said memory to identify whether or not a converted spoken command corresponds with one of said set of spoken commands; and
- means for receiving via a wireless transmission channel said set of templates and for storing this in said memory,
- and a central station arranged to communicate with the mobile communication devices via a wireless transmission channel, the central station having memory means in which is stored said set of templates and transmission means for transmitting the set of templates to the mobile communication devices.

The central station may also have stored in the memory means thereof a set of speech responses also for transmission to the mobile communication devices.

According to a third aspect of the present invention there is provided a method of operating a mobile communication device having speech recognition functionality and comprising a memory for storing a set of speech recognition templates each template corresponding to a single human language, transducer means for converting a command spoken by a user into an electrical signal, and signal processing means arranged to analyse a converted spoken command together with templates stored in said memory to identify whether or not the converted spoken command corresponds one of said set of spoken commands, the method comprising the step of receiving from a central station via a wireless transmission channel said set of speech recognition templates and storing the received set of templates in the memory of the device.

In certain embodiments of the above third aspect of the invention, the method comprises the step of receiving at the mobile communication device, from the central station, a set of speech responses and storing this set in the memory of the device. Each set of speech recognition templates and speech responses preferably corresponds to a single human language.

The method preferably comprises transmitting from the mobile station to the central station a signal requesting said transmission of a set of speech recognition templates and/or speech responses. More preferably, this request specifies the language of the templates and/or responses to be transmitted from the central station to the mobile device.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
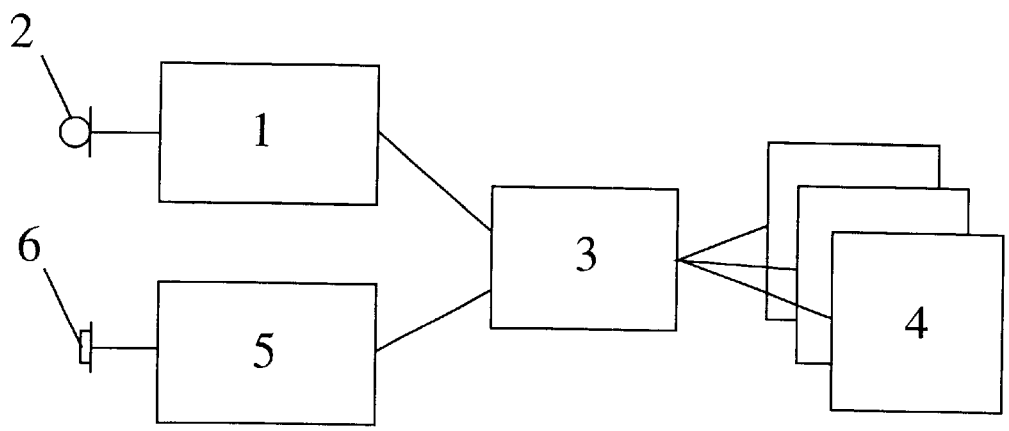
FIG. 1 is a functional diagram of a mobile telephone having speech recognition and speech synthesis functionality.

A mobile telephone having a speech dialogue system (SDS) is shown functionally in FIG. 1. A speech recogniser 1 is coupled to a microphone 2 and converts spoken commands into digital instructions. These instructions are conveyed to a dialogue manager 3 (a 'finite state machine') which activates or processes one of a plurality of phone applications 4 in accordance with the received command. The dialogue manager 3 in turn activates a speech synthesiser 5 to generate 'spoken' messages which are played through a loudspeaker 6 of the telephone.

Figure 2:
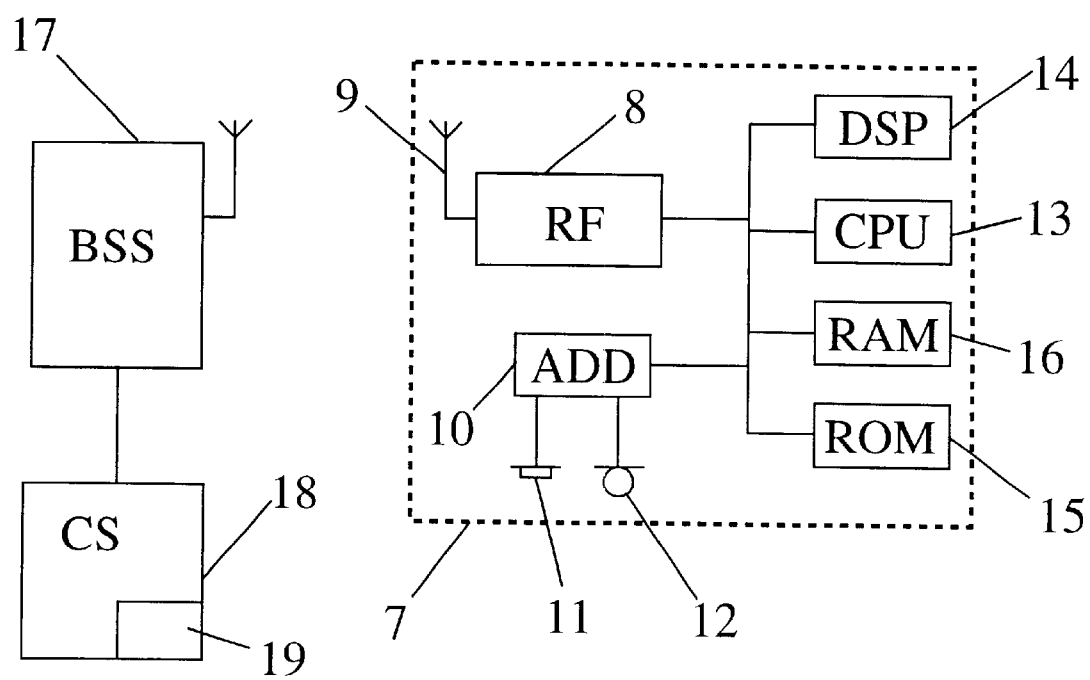
FIG. 2 shows schematically a mobile telephone implementing the functionality of FIG. 1 together with a central station in communication with the mobile telephone.

A simplified schematic diagram of the architecture of a mobile telephone 7 is shown in FIG. 2, the phone being arranged to implement the functions shown in FIG. 1. The telephone comprises a radio frequency (RF) module 8, an RF antenna 9, and an audio device driver (ADD) 10 which drives a loudspeaker 11 and a microphone 12. Both the RF module 8 and the ADD 10 communicate with a central processing unit (CPU) 13 which controls the overall operation of the phone. A digital signal processor (DSP) 14 is provided for performing dedicated tasks such as speech encoding and decoding. Operating software is stored in a read only memory (ROM) 15 whilst user specific software, e.g. names and phone numbers, are stored in a random access memory (RAM) 16.

The mobile telephone 7 communicates via RF wireless transmission with a base station subsystem (BSS) 17 of a cellular telephone network. The BSS 17 is in turn connected, typically via a landline connection, to a central station 18 of the network operator. A user is able to make telephone calls from the mobile telephone 7 in a known manner.

The ROM 15 contains software instructions for controlling the CPU 13 to perform speech recognition on electrical signals generated by the ADD 10 from commands spoken by the telephone user. The speech recognition operation makes use of a look-up table, stored in the RAM 16, which contains a set of templates corresponding to respective spoken commands. These commands include, for example, numbers 0 to 9, 'dial', 'end call', 'search directory'.

Figure 3:
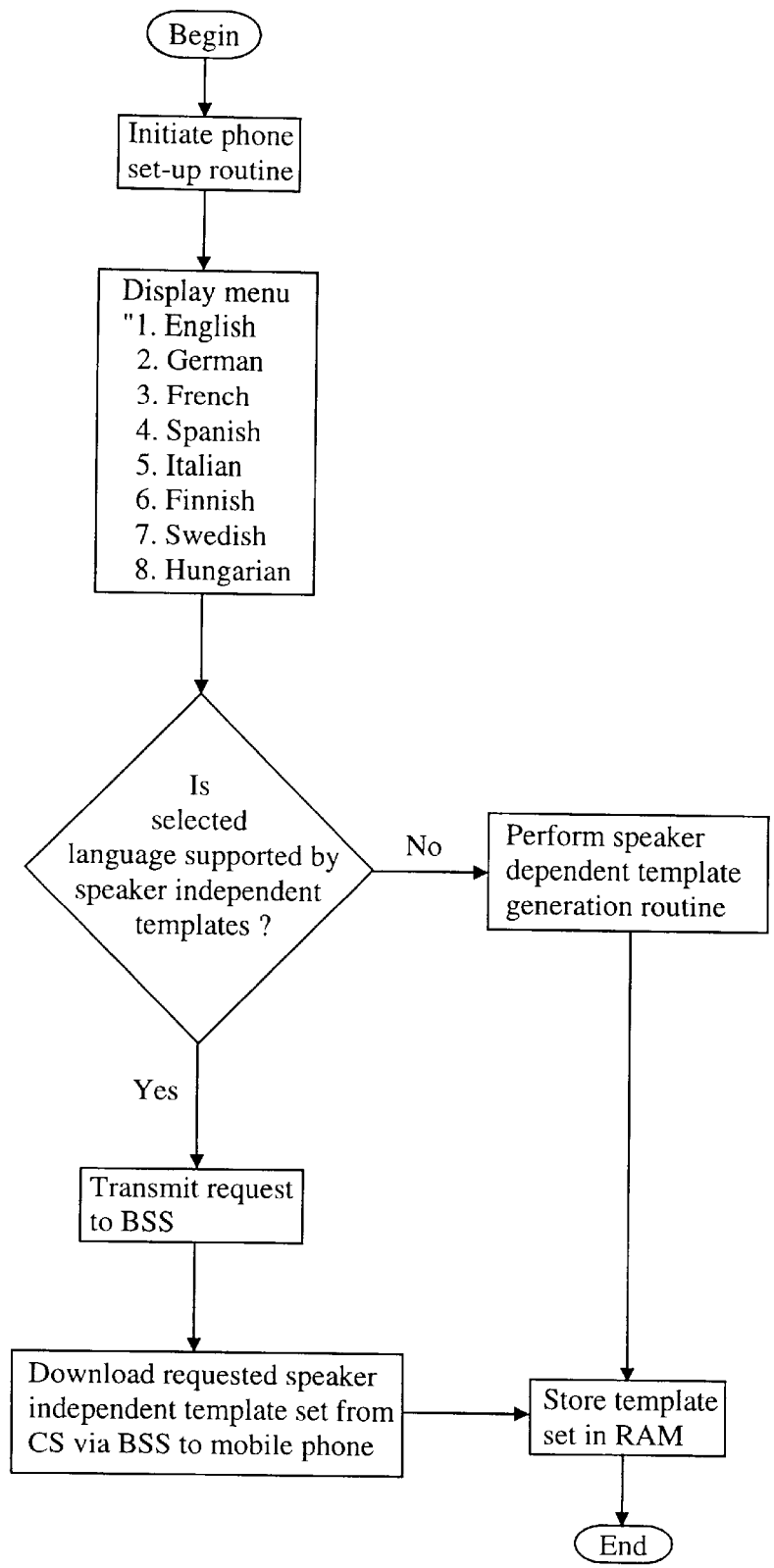
FIG. 3 is a flow chart illustrating the method of operation of the telephone of FIGS. 1 and 2.

The templates of the look-up table may be speaker dependent or speaker independent. The decision as to which form of template is to be used is made when the user carries out a phone set-up routine and in particular when the user selects the operating language of the phone 7. This set-up routine is shown in FIG. 3. If the user opts for a language which is not supported by speaker independent templates (typically a relatively uncommon language), then the CPU 13 performs a training routine, in accordance with software instructions contained in the ROM 15, where commands are displayed on a screen of the phone 7 and the user is requested to speak the displayed command. The CPU 13 then analyses the spoken commands, after conversion into electrical signals by the ADD 10, to generate a template for each command. The templates are then stored as a look-up table in the RAM 16.

In the present example, the templates used are Hidden Markov Models (HMM). An automatic end-pointing algorithm is used to identify the speech start-and end-points and the template is calculated from the end-pointed utterance. The training procedure is described on pages 321–348 in the book by L. Rabiner and B.-H. Juang: "Fundamentals of Speech Recognition", Prentice Hall 1993. Other forms of templates may be used however. In one example, the templates correspond to states in an artificial neural network. The states are conveyed by network weights which are stored in the RAM 16.

When the phone 7 is operated in a speech recognition mode, and a command is spoken by the user, the CPU 13 analyses the converted command to extract therefrom the parameters used to form the stored templates. The stored look-up table is then searched to identify whether or not the extracted parameters correspond to one of the stored templates. Typically, a measure of similarity such as a least squares measure is used with a template being identified as a match if the measure is less than some predefined value. If a match is identified, the CPU 13 acts in accordance with the spoken command, e.g. to commence a dialling operation.

If, during the initial set-up of the phone, the user opts for a language which is supported by speaker independent templates, the CPU 13 causes the phone 7 to transmit a signal to the BSS 17 of the cellular telephone network requesting that a set of speaker independent templates be 'downloaded' to the phone 7. The BSS 17 passes this request to the central station 18 which has a memory 19 in which are stored template sets for the supported languages. The requested template set is then transferred to the phone 7 via the BSS 17 and is stored into the RAM 16 of the phone by the CPU 13.

The information regarding whether a language is supported may be requested or transmitted over the cellular telephone network from the central station 18 to the phone 7. Alternatively, the user may inform the phone of a new supported language.

As illustrated in FIG. 2, the telephone 7 is provided with speech synthesis functionality. This is implemented by providing a look-up table, stored in the RAM 16, containing a set of responses which are played to the user via the ADD 3 and the loudspeaker 4. In the same way as speaker independent templates are downloaded from the CS 18 following a user initiated request, a set of speech responses or the selected language is downloaded from the CS 18 to the phone 7. In some circumstances it may be appropriate to store a set of default responses, for one or more languages, in the RAM 16 or the ROM 15 prior to supplying the phone to the user. This allows reponses to be given by the phone 7 even if the user opts to use speaker dependent templates.

It will be appreciated by a person skilled in the art that various modifications may be made to the embodiment described above without departing from the scope of the present invention. For example, a phone may be provide without means for generating speaker dependent templates in which case, in order to make use of the speech recognition function, the user must download a set of speaker independent templates from the central station 18.

The phone may be supplied to the user with one or more sets of speaker independent templates prestored in the RAM 15 (or in the ROM 16). The user may then add an extra set (or replace an existing set), corresponding to further language, by initiating a request to the CS 18.

Certain of the template generation, speech recognition, and speech generation operations may be performed by the DSP 14 rather than by the CPU 13. The DSP is likely to be well suited for these tasks.

Figure 4:
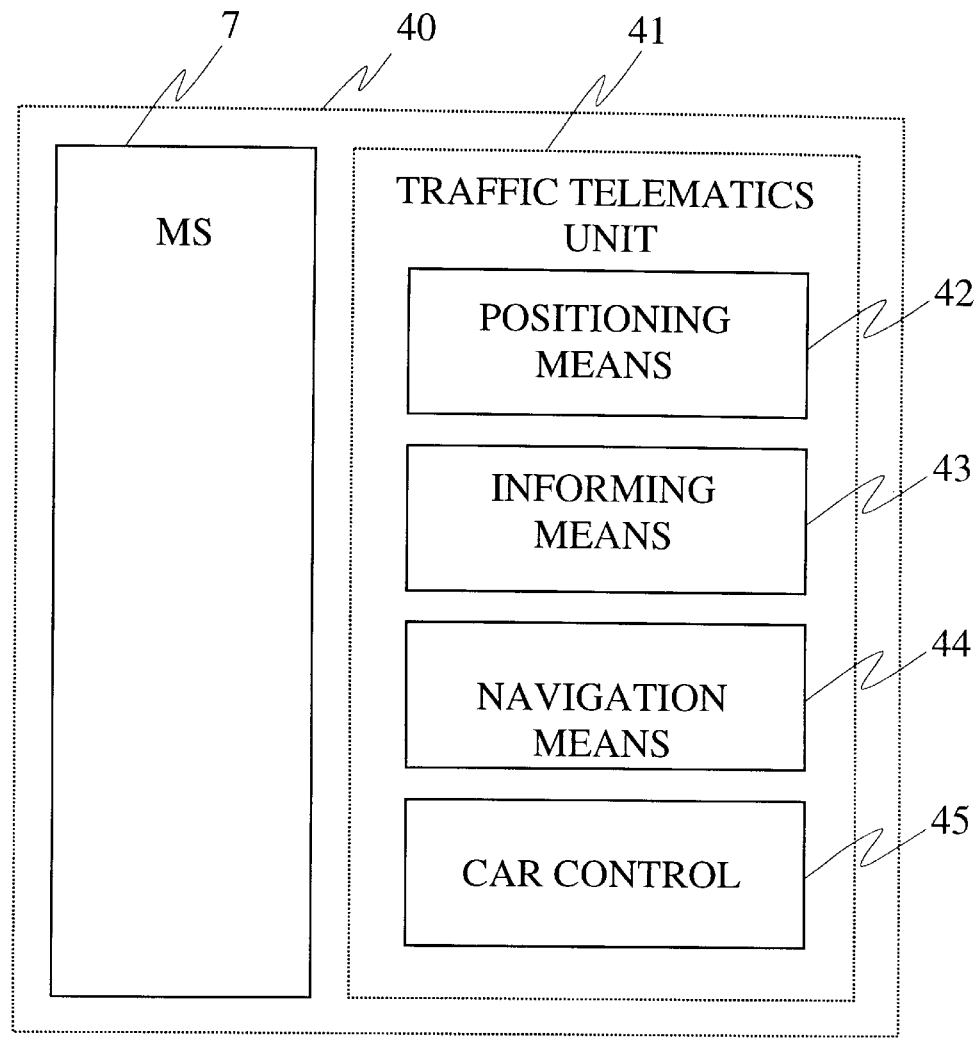
FIG. 4 is a functional diagram of a user terminal having mobile telephone of FIGS. 1–3 and a traffic telematics unit.

A functional diagram of a user terminal 40 having mobile telephone 7 of FIGS. 1–3 and a traffic telematics unit 41 is shown in FIG. 4. The user terminal is preferably mounted in a car. The user terminal comprises a phone 7, as described before, and a traffic telematics unit 41. The traffic telematics unit provides the user, who is typically a car driver or a passenger, with useful services such as navigation, information gathering or car control. A mobile communication device, such as phone 7, is required to establish real time connection for the traffic telematics unit. The traffic telematics unit shown in FIG. 4 preferably comprises positioning means 42 for automatic detection of geographic position of the vehicle in which the system is mounted. The traffic telematics unit may also comprise navigation means 44 and informing means 43 to guide a traveller to the destination and to provide him/her with useful information. The user terminal may even comprise means for car control 45 to control the use of a car. This could be used for example to protect a vehicle against illegal use and the car radio functions or mirror settings and other settings could be controlled by the car control unit.

The speech templates and/or responses gatherer by the mobile phone 7 can be used by the traffic telematics unit for operation by speech commands and/or speech responses.

What is claimed is:

1. A mobile communication device having speech recognition functionality and comprising:

a memory for storing a set of speech recognition templates corresponding to a set of respective spoken commands, each template corresponding to a human language;

transducer means for converting a spoken command into an electrical signal;

signal processing means for analyzing a converted spoken command together with templates stored in said memory to identify whether or not the converted spoken command corresponds with one of said set of spoken commands; and means for receiving via a wireless transmission channel said set of templates an for storing said templates in said memory; aid templates received via said wireless transmission being speaker independent.

2. A device according to claim 1 and comprising selection means for enabling a user to select a language set for reception via said wireless transmission channel.

3. A device according to claim 1 and comprising means for generating a set of speaker dependent templates using commands spoken by a user and converted by said transducer means, and means for storing templates so generated in said memory of the device.

4. A device according to claim 3 and comprising means for selecting either a set of speaker dependent templates or a set of speaker independent templates stored in the memory for use by said signal processing means.

5. A device according to claim 1 and comprising means for receiving via said wireless transmission channel a set of speech responses and means for storing such a received set in said memory.

6. A device according to claim 5, wherein the set of received responses correspond to a single human language.

7. A device according to claim 5, wherein said mobile communication device comprises means for connecting with a traffic telematics unit, at least one of said speech responses being arranged to be used by said telematics unit.

8. A device according to claim 1, wherein said mobile communication device comprises means for connecting with a traffic telematics unit, at least one of said speech recognition templates being arranged to be used by said traffic telematics unit.

9. A device according to claim 1, wherein the set of templates which are transmitted are all speaker independent.

10. A mobile telephone network comprising a multiplicity of mobile communication devices, which devices have speech recognition functionality, said devices comprising:

a memory for storing a set of speech recognition templates corresponding to a set of respective spoken commands, each template corresponding to a human language;

transducer means for converting a spoken command into an electrical signal;

signal processing means for analyzing a converted spoken command together with templates stored in said memory to identify whether or not a converted spoken command corresponds with one of said set of spoken commands; and means for receiving via a wireless transmission channel said set of templates and for storing said templates in said memory, and a central station arranged to communicate with the mobile communication devices via a wireless transmission channel, the central station having memory means in which is stored said set of templates and transmission means for transmitting the set of templates to the mobile communication devices; the set of templates which are transmitted being speaker in dependent.

11. A network according to claim 10 and comprising a set of speech responses, stored in the memory means of the central station, for transmission to the mobile communication devices.

12. A mobile telephone network according to claim 10, wherein the set of templates which are transmitted are all speaker independent.

13. A method of operating a mobile communication device having speech recognition functionality and comprising a memory for storing a set of speech recognition templates, each template corresponding to a human language, transducer means for converting a command spoken by a user into an electrical signal, and signal processing means for analyzing a converted spoken command together with templates stored in said memory to identify whether or not the converted spoken command corresponds with one of said set of spoken commands, the method comprising the step of receiving from a central station via a wireless transmission channel said set of speech recognition templates and storing the received set of templates in the memory of the device; said set of templates which are received being speaker independent.

14. A method according to claim 13 and comprising the step of receiving at the mobile communication device, from the central station, a set of speech responses and storing this set in the memory of the device.

15. A method according to claim 14, wherein each set of speech recognition templates and speech responses corresponds to a single human language.

16. A method according to claim 13 and comprising transmitting from the mobile station to the central station a signal requesting said transmission of a set of speech recognition templates, this request signal identifying the language of the templates to be transmitted from the central station to the mobile device.

17. A device according to claim 13, wherein the set of templates which are transmitted are all speaker independent.

* * * * *

UNITED STATES PATENT AND TRADEMARK OFFICE
CERTIFICATE OF CORRECTION

PATENT NO. : 6,393,403 B1
DATED : May 21, 2002
INVENTOR(S) : Majaniemi

It is certified that error appears in the above-identified patent and that said Letters Patent is hereby corrected as shown below:

Column 6,
Line 52, after "functionality" insert -- for recognizing plural human languages --
Lines 55-56, replace "to a human language" with -- one of said languages --

Column 7,
Line 32, after "functionality" insert -- for recognizing plural human languages --
Lines 35-36, replace "to a human language" and with -- one of said languages --

Column 8,
Line 16, after "functionality" insert -- for recognizing plural human languages --
Line 18, replace "to a human language" with -- one of said languages --

Signed and Sealed this

Twenty-second Day of October, 2002

*Attest:*

JAMES E. ROGAN
*Attesting Officer*       *Director of the United States Patent and Trademark Office*